(12) United States Patent  
Gayden

(10) Patent No.: US 7,755,481 B2
(45) Date of Patent: Jul. 13, 2010

(54) DISASTER WARNING SYSTEM

(76) Inventor: Larry George Gayden, 225 Evergreen Garden Dr., Elizabethtown, KY (US) 42701

( * ) Notice: Subject to any disclaimer, the term of this patent is extended or adjusted under 35 U.S.C. 154(b) by 584 days.

(21) Appl. No.: 11/823,970

(22) Filed: Jun. 29, 2007

(65) Prior Publication Data

US 2009/0002181 A1    Jan. 1, 2009

(51) Int. Cl.
*G08B 1/08* (2006.01)
(52) U.S. Cl. .................. 340/539.26; 340/539.28; 340/601; 340/628; 340/691.6; 340/693.6; 73/170.16
(58) Field of Classification Search .............. 340/540, 340/500, 539.1, 539.14, 539.26, 539.28, 340/601, 7.48, 539.16, 539.17, 539.22, 541, 340/628, 629, 630, 691.1, 691.6, 693.6; 702/3; 73/170.16

See application file for complete search history.

(56) References Cited

U.S. PATENT DOCUMENTS

| | | | |
|---|---|---|---|
| 5,355,350 A | 10/1994 | Bass et al. | |
| 6,255,953 B1 * | 7/2001 | Barber | 340/601 |
| 6,295,001 B1 * | 9/2001 | Barber | 340/601 |
| 6,392,538 B1 | 5/2002 | Shere | |
| 6,617,964 B1 | 9/2003 | Lamb | |
| 7,049,971 B2 | 5/2006 | Guillory | |
| 7,050,784 B2 | 5/2006 | Clark | |
| 7,053,753 B2 | 5/2006 | Kacalek et al. | |
| 7,066,020 B1 | 6/2006 | Moore et al. | |
| 7,139,664 B2 | 11/2006 | Kelly et al. | |
| 7,145,466 B2 | 12/2006 | Haynes et al. | |
| 7,479,893 B2 * | 1/2009 | Weston et al. | 340/632 |
| 7,515,041 B2 * | 4/2009 | Eisold et al. | 340/506 |

* cited by examiner

*Primary Examiner*—Toan N Pham
*Assistant Examiner*—Kerri McNally
(74) *Attorney, Agent, or Firm*—Townsend and Townsend and Crew LLP

(57) ABSTRACT

A disaster warning system including a weather radio, a tornado acoustic signature detector combined with a smoke detector and a carbon monoxide detector. The disaster warning system includes a central control unit and peripheral alarm unit, which report the alarm signals generated by the control unit.

20 Claims, 6 Drawing Sheets

DISASTER WARNING SYSTEM

FIELD OF INVENTION

This invention relates generally to a multi-function disaster warning system especially suited for a personal residence or smaller commercial structure located in a geographic region, where severe weather often occurs.

DESCRIPTION OF THE PRIOR ART

The constant march of time has brought with it the development of technology that has allowed humans to control much of daily life and subsequently improve the level of health and comfort. Although humans enjoy the control over most of the life on the Earth, the environment and the weather have yet to yield to humans. Across the United States, extreme and dangerous weather is a common occurrence all year long. Even though winter brings frigid temperatures and mountains of snow, summertime brings one of the most ruthless features of weather: the tornado.

The most effective way to protect against the destructive force of a tornado is to get as far away from it as possible. If evading the tornado is not a viable option, securing oneself in a cellar or structurally rigid room is the next best option. Unlike other dangerous weather systems, like summer hurricanes, tornado formation is very difficult to predict. Once the funnel has formed, the path followed is extremely erratic. Thus, it is imperative that a tornado warning is issued as early as possible to allow for adequate time to seek protection.

In regions of the United States where tornados are more common, local governments and municipalities utilize civil defense siren systems to provide warnings to the community within range of the siren systems. The sirens are erected throughout communities and are activated by a central authority in case of severe weather, natural disaster, war or other emergency conditions. Although the sirens can produce a piercing and attention-getting noise, the volume quickly decreases over distance and the sound may be cancelled out by other ambient sound. Additionally, the constant hum of air conditioning units, televisions, and radios squelch the effectiveness of the tornado sirens.

Improvements in meteorology and satellite tracking have assisted the detection of tornados and severe weather. The National Weather Service (NWS) and the National Oceanographic and Atmospheric Administration (NOAA) operate storm satellites and compile weather-related data in order to predict the paths of severe storms and tornados. When the NWS or NOAA has enough data that suggest a potentially dangerous weather condition, the agencies issue warnings. Often, the warnings are directed to large regions of a state and sometimes focused on a few specific counties. NOAA operates a 24-hour radio service which broadcasts weather-related information from the local NWS station. Unique radio receivers are required to tune in the NWS radio signal. New NWS-compatible radios have incorporated the Specific Area Message Encoding (SAME) technology which allows the radio to be tuned so that it only picks up radio signals, and severe weather information, directed to a specific locality. Currently, the NWS radio transmissions and NWS-compatible radio receivers can be tuned to pick up signals directed to specific counties.

While severe weather warnings, broadcast by NWS, can be focused to specific counties, the warnings are still disregarded. The repetition of false warnings for tornados and severe weather can still create numbness to the warnings. Thus, a significant need exists for a system which not only provides warnings for potential tornados and severe weather, but also provides notification of an impending and approaching tornado.

SUMMARY

The present invention is directed to a disaster warning system comprising a control unit, at least one peripheral alarm unit operationally connected to the control unit, and at least one peripheral acoustic sensor unit operationally connected to the control unit. The control unit comprises a smoke detector, a carbon monoxide detector, a radio receiver, wherein the radio receiver is tunable to receive transmissions from commercial transmitters, governmental transmitters, and military transmitters, and wherein the radio receiver is dimensioned and configured to receive location-specific weather alerts. The control unit further comprises a plurality of notification devices comprising light emitting diodes (LED), speakers and vibrators. The control unit further comprises a transmitter, a signal generator operationally connected to a transmitter, a module board, and a LCD screen, wherein the LCD screen displays textual information about the status of the disaster warning system and information received by the radio receiver. The at least one peripheral alarm unit is dimensioned and configured to create an alarm notification in response to an alarm signal transmitted by the control unit. The peripheral alarm unit comprises a receiver and a plurality of notification devices comprising speakers, light emitting diodes, and vibrators. The at least one peripheral acoustic sensor unit is dimensioned and configured to detect an acoustic signature of an approaching tornado, and upon detection of an approaching tornado, the peripheral acoustic sensor unit generates a tornado warning signal and sends the signal to the control unit. The control unit decodes the tornado warning signal and activates the plurality of notification devices. The control unit also sends the tornado warning signal to the at least one peripheral alarm unit, and the at least one peripheral alarm unit decodes the tornado warning signal and activates the plurality of notification devices. The control unit generates a warning signal, and the smoke detector or carbon monoxide detector is activated. The control unit then sends the warning signal to the peripheral alarm unit, and the peripheral alarm unit decodes the warning signal and activates the plurality of notification devices. The radio receiver is dimensioned and configured to receive location-specific weather alerts and play the weather alerts through the speaker and the control unit. The control unit sends the weather alert to the at least one peripheral alarm unit, and the at least one peripheral alarm unit plays the weather alert through the speaker.

The at least one peripheral alarm unit is operationally linked to the control unit via either a wireless connection or a hardwire connection. The peripheral acoustic sensor unit is operationally linked to the control unit via either a wireless connection or a hardwire connection. The module board, of the present invention, is dimensioned and configured to allow the integration of additional disaster warning detectors into the disaster warning system. The control unit further comprises auxiliary input connections dimensioned and configured to connect to hardwired information services.

The present invention further comprises at least one modular notification device, wherein the at least one modular notification device collects data and generates a notification signal. The at least one modular notification device is operationally connected to the module board. The control unit further comprises a plurality of interfaces comprising telephone jacks, Ethernet jacks, and coaxial cable inputs. The plurality of interfaces connect the control unit to wire-based information services and the internet. The at least one modular notification device comprises a weather monitoring station and a seismic disturbance monitor.

The present invention further comprises a control unit, which comprises a transceiver. The present invention further comprises at least one peripheral alarm unit, dimensioned and configured to create an alarm notification in response to an alarm signal transmitted by the control unit. The peripheral alarm unit further comprises a transceiver, and a plurality of notification devices comprising speakers, light emitting diodes, and vibrators. The peripheral alarm unit further comprises a motion detector, wherein the motion detector is dimensioned and configured to create a motion detection signal in response to motion, and send the motion detection signal to the control unit.

The present invention is a disaster warning system ideally suited for a homeowner or small-business owner. As more homeowners request complex security and warning systems, the present invention provides an efficient, adaptable, and effective solution. The control unit includes a weather-radio receiver incorporating Specific Area Message encoding (SAME) technology, which allows a user to fine tune the radio to pick up only locality-specific information from the National Weather Service (NWS). Only when the radio receiver picks up a location-specific broadcast from NWS, the control unit broadcasts the message through the speaker in the control unit.

The system also includes a peripheral acoustic sensor unit, which detects the sound-signature of approaching tornadoes. The acoustic sensor is affixed to a location outside of the building, such as a roof or exterior wall. The acoustic sensor picks up the sound of an actual tornado, after touchdown. Generally, the acoustic sensor can detect a tornado when the tornado is approximately 30 to 90 seconds away from the location. The acoustic sensor generates a signal and sends it to the control unit, which then sounds an alarm for the occupants of the building. Because the acoustic sensor actives an alarm only when a tornado is approaching, the warning is taken very seriously.

The central control unit also includes both a carbon monoxide detector and a smoke detector. When either of the built-in detectors senses carbon monoxide or smoke, the control unit sounds an alarm.

The disaster warning system also includes at least one peripheral alarm unit, designed to be placed in rooms away from the control unit. The peripheral alarm units are connected to the control unit either by a wireless connection or a hardwired connection. Whenever the control unit registers an alarm notification, the control unit first activates the notification systems on the control unit, then sends the same signal to each peripheral alarm unit. After receiving an alarm signal, each peripheral alarm unit activates the notification systems in the peripheral alarm unit.

The advantages of this disaster warning system include the compact design of a single control unit incorporating a smoke detector, a carbon monoxide detector, a tornado acoustic signature detector, and a NWS radio receiver. The control unit also has a modular board into which other notification modules can be connected. This allows the user to expand the disaster warning system to include other relevant warning systems. The wireless capability of the peripheral alarm units are advantageous for use in buildings with concrete, steel or designs which limit hardwiring.

The notification and alert components in both the control unit and the peripheral alarm unit include visible, audible and tactile alerts. Each unit contains a flashing LED, a speaker, and a vibration unit. The control unit also includes a liquid crystal display (LCD) screen, which displays text broadcast from NWS, or general information about the system.

The objects and advantages of the invention will appear more fully from the following detailed description of the preferred embodiment of the invention made in conjunction with the accompanying drawings.

DETAILED DESCRIPTION

Figure 1A:
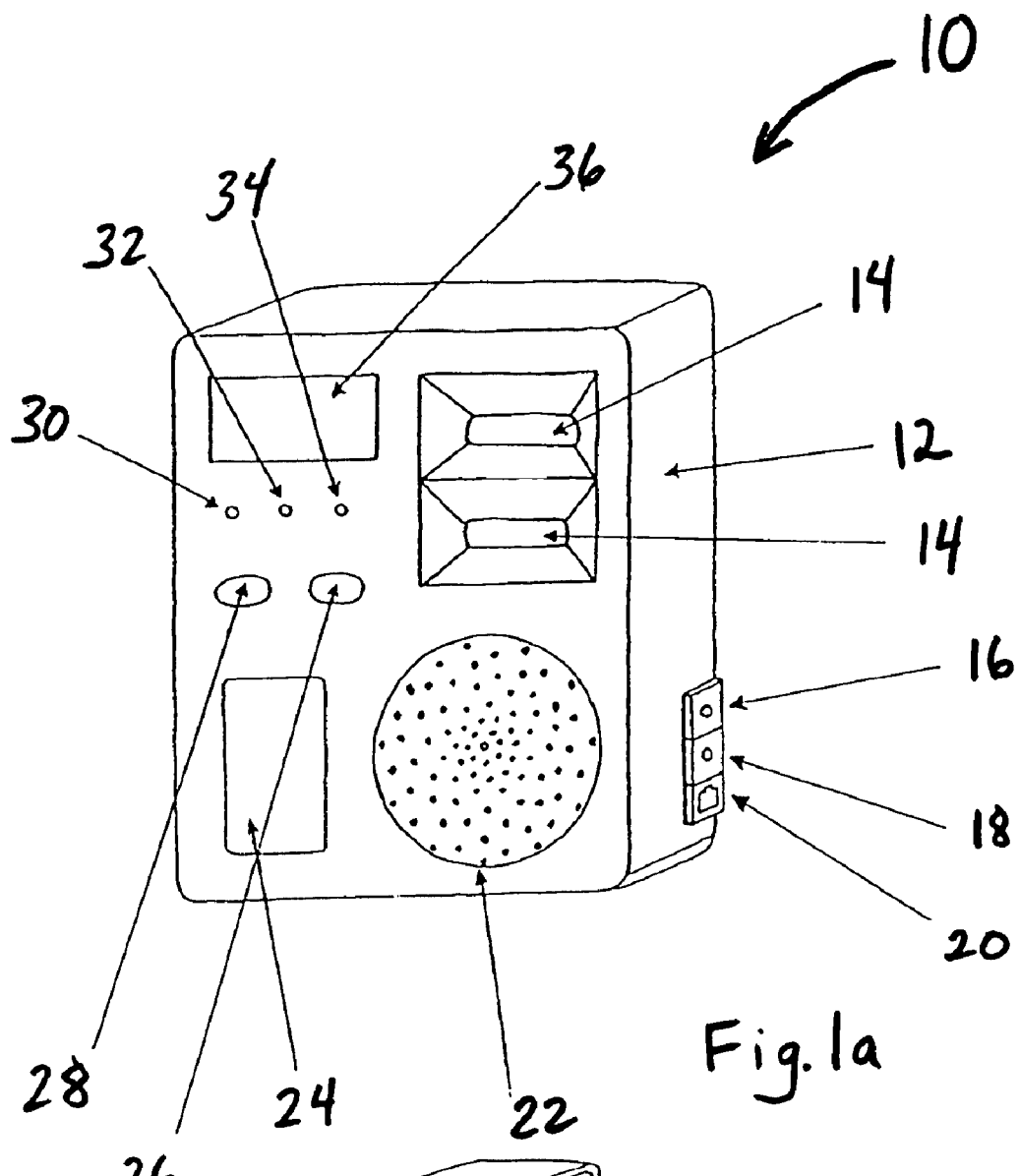
FIG. 1a is a front elevation of the control unit.

FIG. 1a is a front elevation of the control unit 10 of the present invention. The control unit 10 includes a hard outer case 12, preferably made of a non-shock and rigid plastic material. The outer case 12 provides a housing for all of the electrical and notification equipment for the disaster warning system. The control unit 10 includes a plurality of notification devices including flashing light emitting diodes (LED) 14, a speaker 22, and an internal vibration unit. The LEDs 14 preferably will flash a bright light whenever a notification signal is detected. The sequence of flashing and the color of the LEDs can be adjusted to differentiate signals from different disaster warning units. For example, a faster sequence of flashing can be programmed to occur when the smoke detector is activated; when the carbon monoxide detector is activated, the LEDs 14 can have a steady-on pattern. The speaker 22 plays an adjustable tone based on specific warning notifications. The speaker 22 can also play the NWS-broadcasted signal picked up by the radio contained within the control unit 10. The vibration unit within the control unit 10 creates a robust and modifiable vibration based on specific warning notifications. In the preferred embodiment, the notification signals include audible, visible and tactile notifications; however, it is within the scope of the invention to include other notification systems.

The control unit 10 also includes auxiliary connections for input signals and output signals. The control unit 10 includes an auxiliary flash output 16 into which an auxiliary flasher or light can be connected. An auxiliary speaker output 18 is also provided on the outer case 12. A telephone jack 20 is provided in the control unit as a means to connect the disaster warning system to telephone wire-based information services.

Figure 2:
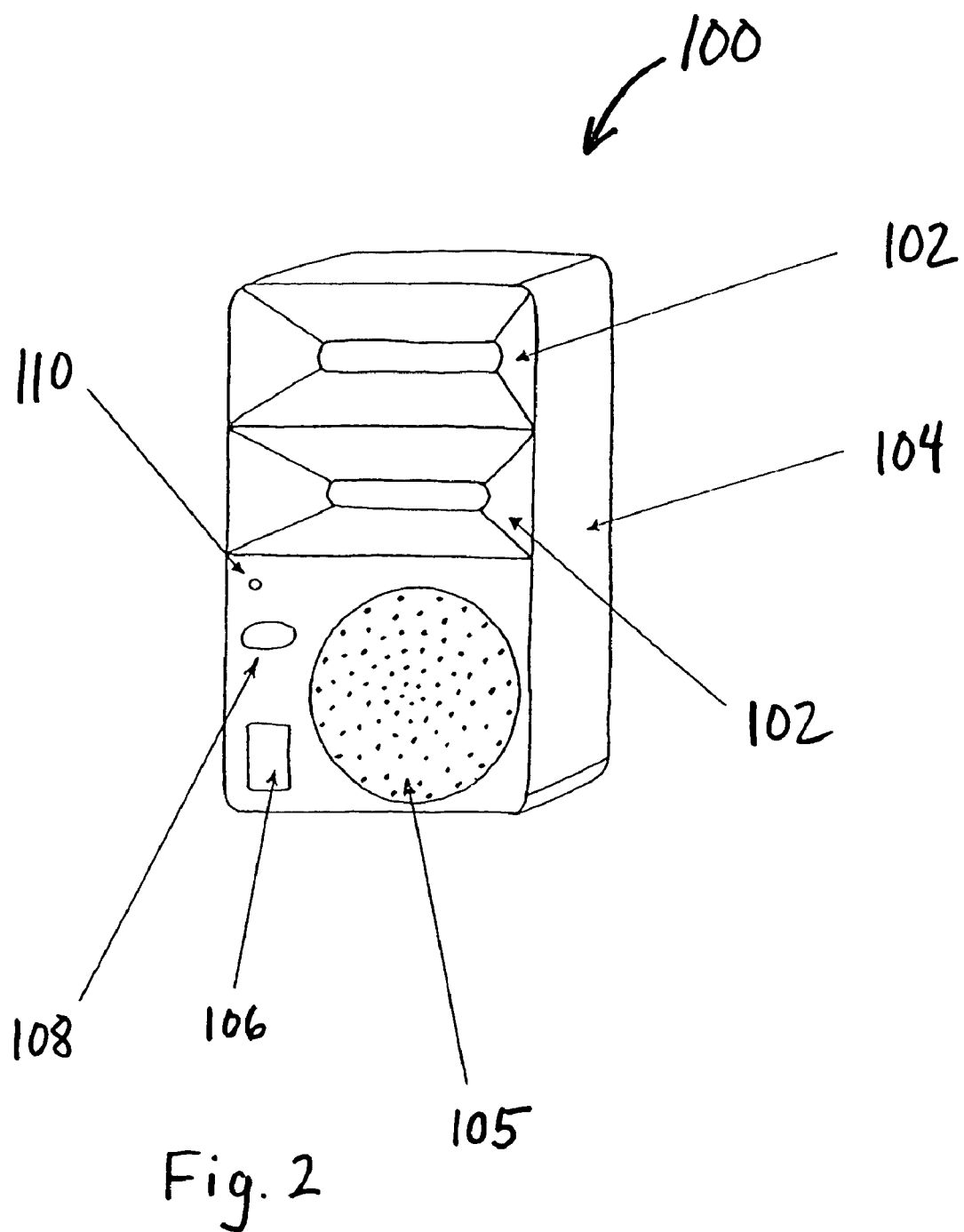
FIG. 2 is a front elevation of the peripheral alarm unit.

A wireless transceiver 24 allows the control unit 10 to both transmit and receive wireless information. It is within the scope of the invention that the frequency transmitted and received by the control unit 10 is such that it will not interfere with external radio or wireless frequencies. The wireless transceiver 24 is dimensioned and configured to communicate with the peripheral alarm units 100, as shown in FIG. 2. The wireless transceiver 24 is separate from the NWS radio receiver capable of receiving NWS broadcasts. Although the preferred embodiment utilizes wireless communication, it is within the scope of the invention to use wired connections instead of wireless.

The control unit 10 includes a test button 26 and a power button 28. When the test button 26 is pressed, the control unit responds with a notification signal indicating that the system is in good condition. The control unit 10 includes several LED status lights including a signal LED 30, a sensor LED 32, and a low battery indicator 34. The signal LED 30 indicates whether or not the NWS radio receiver is functioning. The sensor LED 32 indicates whether or not the wireless transceiver is functioning properly. The low battery indicator 34 indicates the amount of charge left in the backup battery in the control unit 10.

The control unit 10 also has a LCD screen 36, which displays text information broadcast by the NWS, and provides status information about the disaster warning system.

Figure 1B:
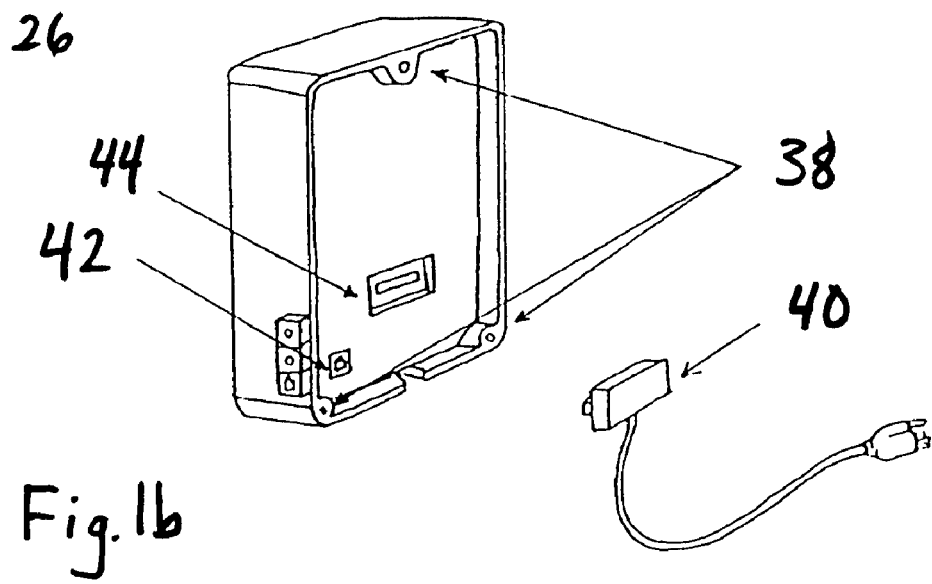
FIG. 1b is a rear elevation of the control unit.

FIG. 1b is a rear elevation of the control unit 10. The outer case 12 can be mounted to a wall or other structure through the use of mounting holes 38. The control unit 10 is preferably powered via an AC power source connected via the power wire 40. The control unit has a DC battery backup in case of AC current shortages. An Ethernet jack 42 allows the control unit 10 to connect to the internet via a high bandwidth connection.

FIG. 2 is a front elevation of a peripheral alarm unit 100. Peripheral alarm units 100 communicate with the control unit 10 and provide notification and alarm signals. Each peripheral alarm unit 100 is designed to be small in size and easily placed throughout a residential or commercial building. The outer case 104 is similarly constructed to the outer case 12 of the control unit 10. The outer case 104 is preferably constructed of a non-shock rigid plastic material. Each peripheral alarm unit 100 contains a plurality of notification devices, similar to the control unit 10. In the preferred embodiment, each peripheral alarm unit 100 contains a flashing LED unit 102, a speaker 105, and a vibrating unit. Similar to the notification devices 14, 18 in the control unit, the flashing LED 102, speaker 105 and vibrating unit can be adjusted to relay specific alarms for specific situations.

Each peripheral alarm unit 100 maintains communication with the control unit 10 via either a wire connection or a wireless transceiver 106. In a preferred embodiment, the peripheral alarm unit 100 not only receives information from the control unit 10, but also transmits information and signals back to the control unit 10. In such an embodiment, the peripheral alarm unit 100 also contains a motion detector, which when activated would send an alert signal back to the control unit 10. In another embodiment, a peripheral alarm unit 100 without a motion detector would only require a passive receiver instead of a transceiver 106.

Each peripheral alarm unit includes a test button 108 which provides feedback of the status. Each peripheral alarm unit 100 can draw power from an AC source or DC source. A low battery LED 110 indicates the charge life of a battery backup system.

Figure 3A:
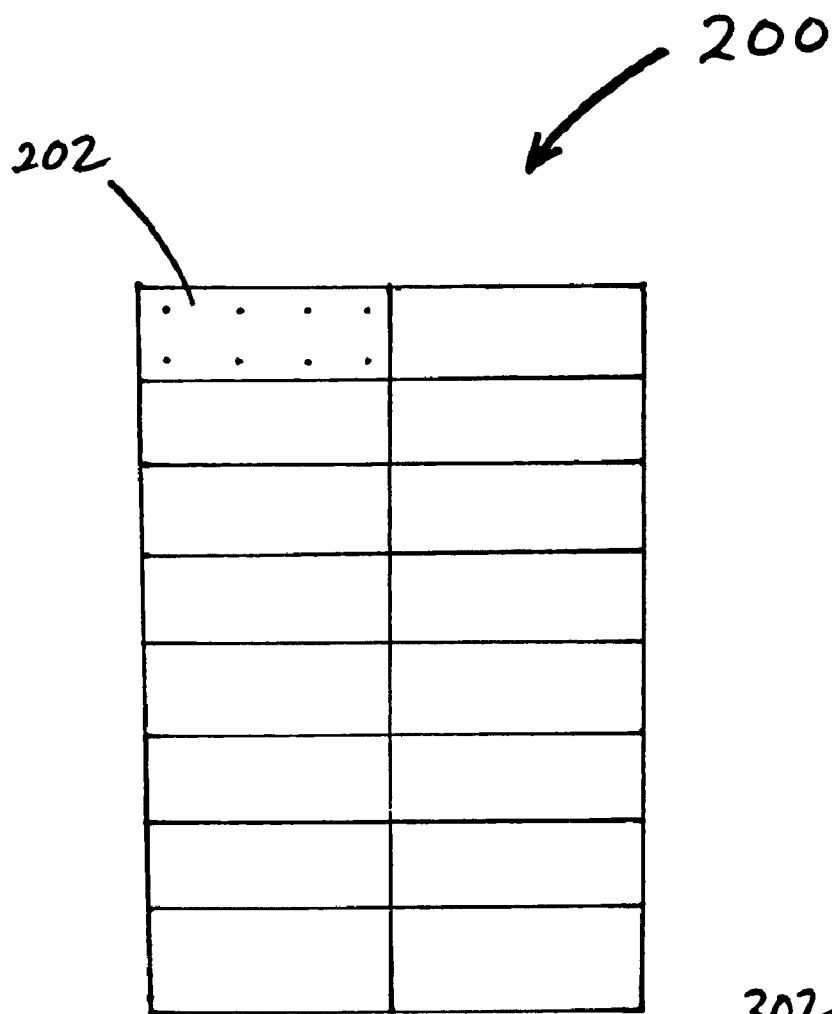
FIG. 3a is an illustration of an integrative module board for the control unit
Figure 3B:
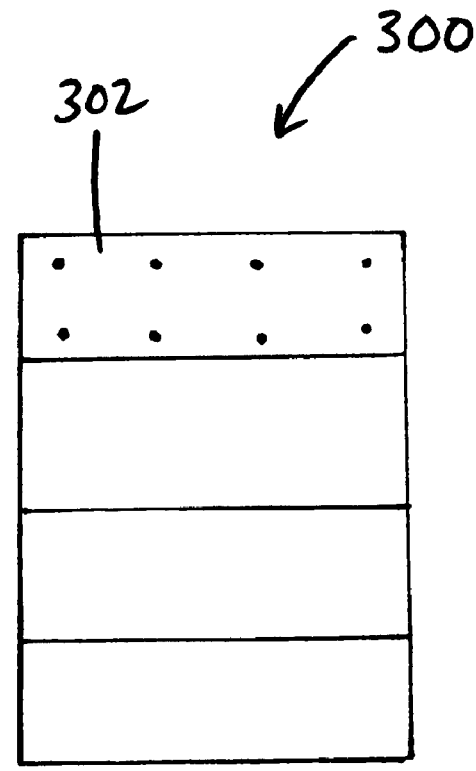
FIG. 3b is an illustration of an integrative module board for the peripheral alarm unit.

FIG. 3a is an illustration of an integrative module board 200 for the control unit 10. Additional modular warning devices can be connected to the module integration connection 202. FIG. 3b is an illustration of an integrative module board 300 for the peripheral alarm unit 100. Additional modular warning devices can be connected via the modular integration connection 302. The module boards 200, 300 allow the entire disaster warning system to be customizable for specific consumer needs. Examples of potential modular warning devices include detection units for radon, high wind, natural gas detection, earthquake and seismic activity, and glass breakage.

Figure 4:
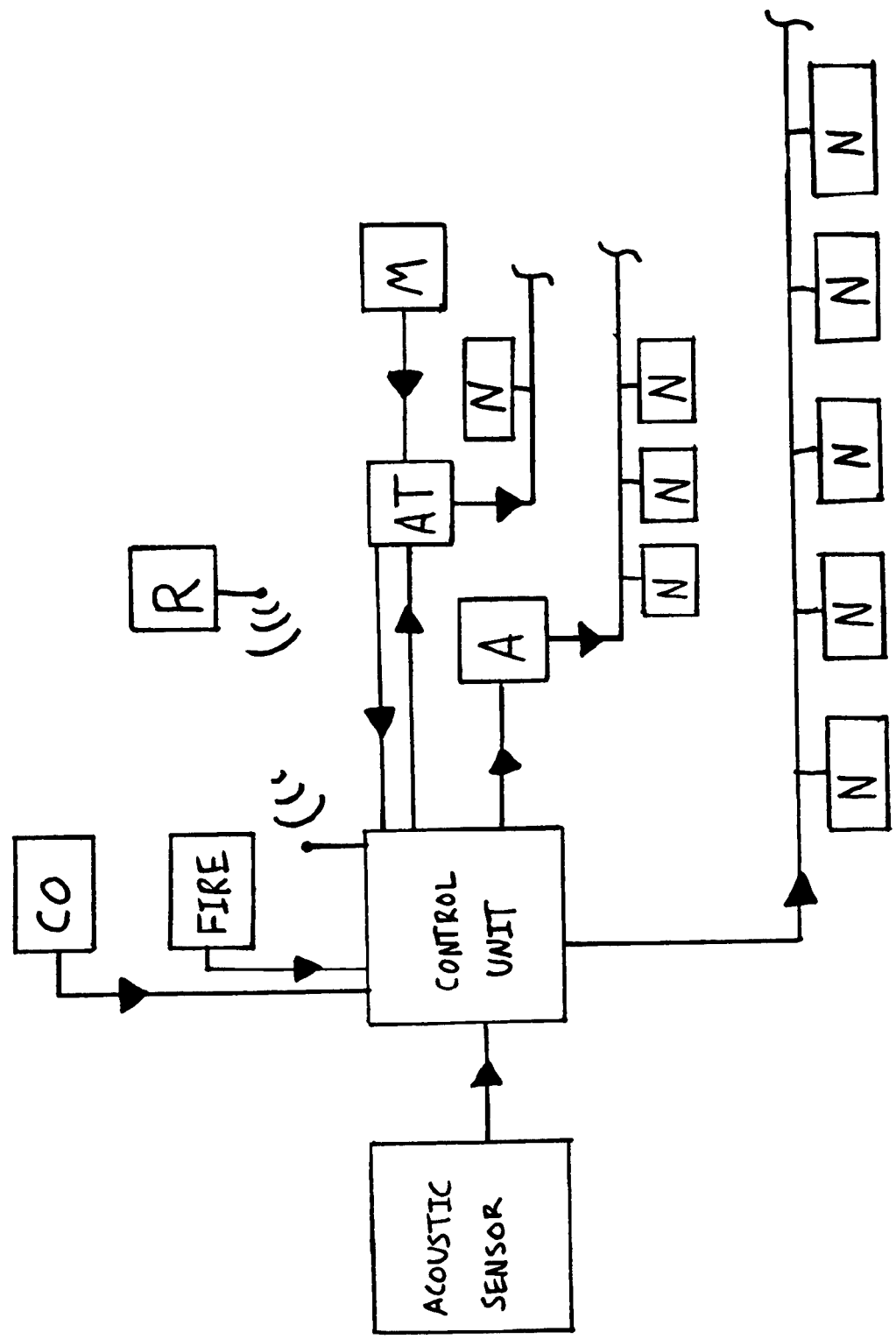
FIG. 4 is a schematic diagram of the disaster warning system of the present invention.

FIG. 4 is a schematic diagram of the disaster warning system of the present invention. The control unit processes information and warning signals from peripheral devices, such as the acoustic sensor, and integrated devices, such as the carbon monoxide detector CO and the smoke detector FIRE. The control unit also receives radio broadcasts disseminated by the National Weather Service R. The control unit is connected to peripheral alarm units A, AT via wireless or wired connections. The control unit and the peripheral alarm units A, AT include a plurality of notification devices N. Some peripheral alarm units are passive A and only receive information, and others are active AT and can transmit information back to the control unit. The active peripheral alarm unit AT, illustrated in FIG. 4, is connected to a motion detector M.

FIG. 4 illustrates a typical configuration of the disaster warning system. The control unit constantly monitors the NWS radio broadcast for location-specific information, because the radio receiver has been tuned using SAME technology. When the NWS broadcasts a signal for the location, in which the control unit is based, the control unit begins broadcasting the audible alert. This audible alert is commonly a prerecorded or computer synthesized voice explaining that severe weather is approaching. The control unit forwards that same broadcasted signal to the peripheral alarm units A, AT, which then play the broadcast through their integrated speakers. If the acoustic sensor detects the sound signature of an approaching tornado, a notification signal is generated and sent to the control unit. Upon receipt of the tornado warning signal, the control unit activates any of a plurality of notification devices N. The control unit also forwards the tornado warning to the peripheral alarm units A, AT, which subsequently activate their notification devices N. In a similar manner, if either the carbon monoxide detector CO or smoke detector FIRE is activated in the control unit, the notification signal will be forwarded to all of the peripheral alarm units A, AT. In another example, a peripheral alarm unit may be equipped with a motion detector M. If the motion detector is activated, the peripheral alarm unit AT transmits a signal back to the control unit.

Figure 5:
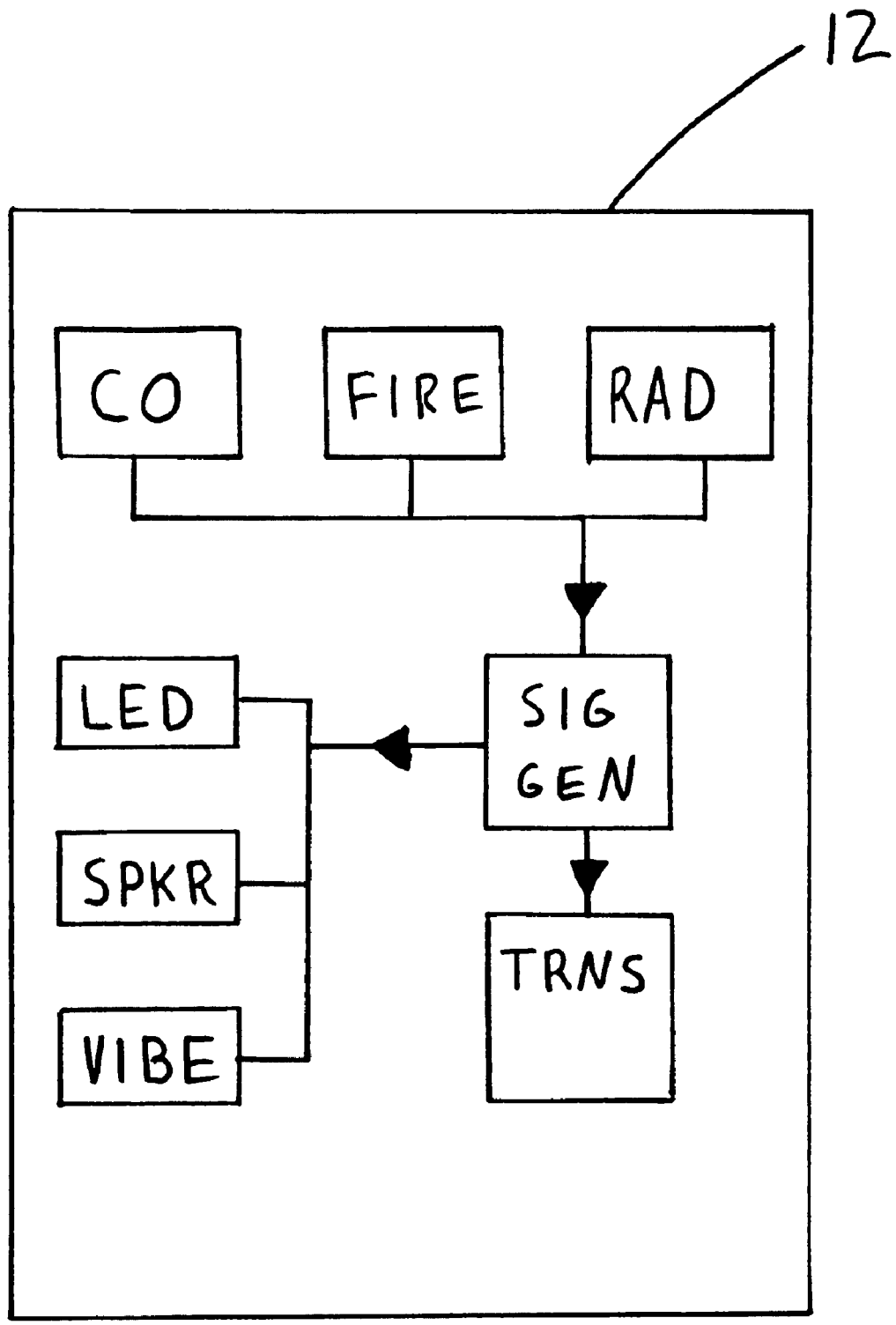
FIG. 5 is a schematic diagram of the notification system in the control unit.
Figure 6:
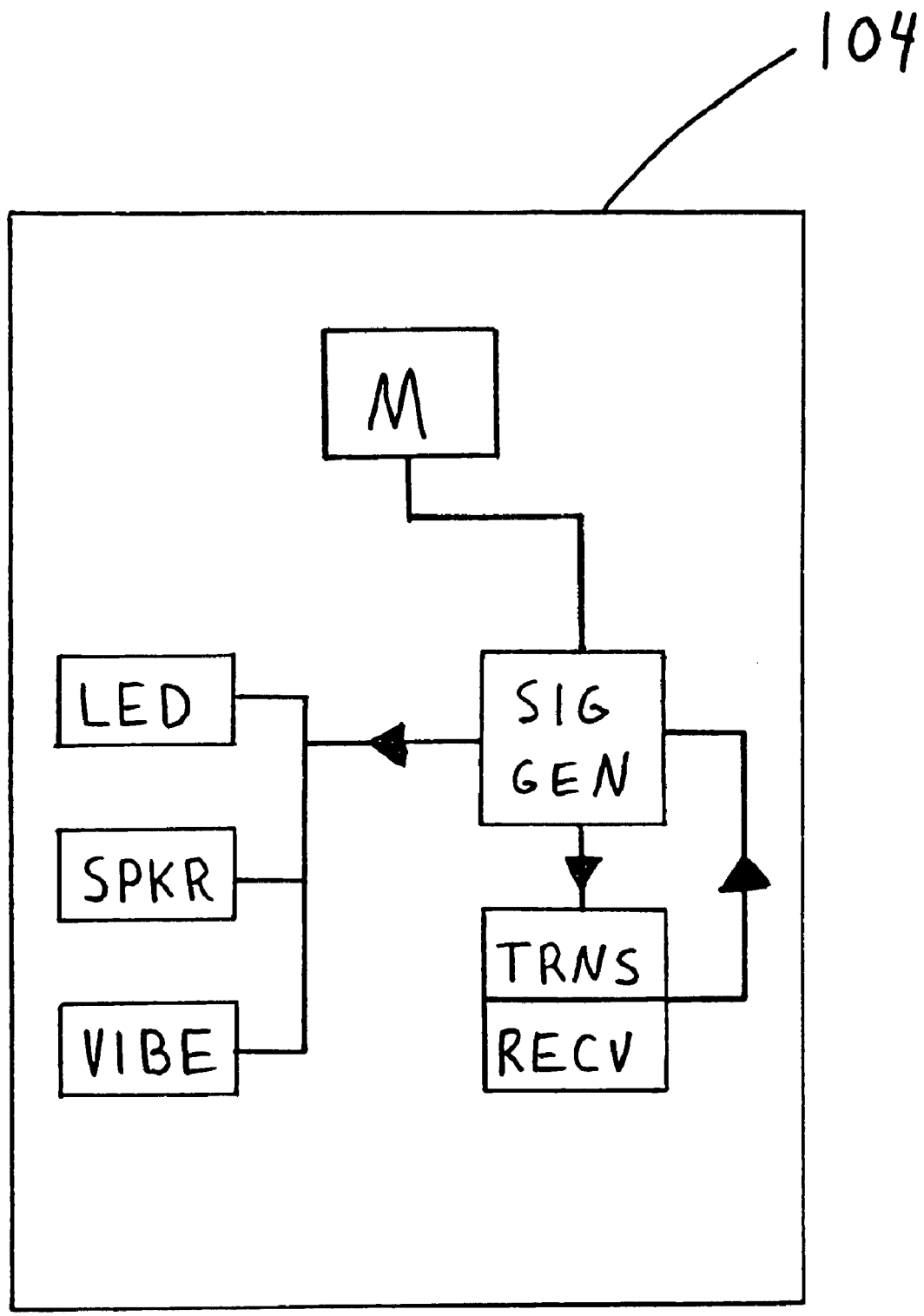
FIG. 6 is a schematic diagram of the notification system in the peripheral alarm unit.

FIG. 5 is a schematic diagram of the notification pathway of the control unit 10. When the carbon monoxide detector CO, the smoke detector FIRE, or the NWS radio receiver is activated, the signal generator SIG GEN creates an alarm signal. The signal generator SIG GEN then sends the signal to the plurality of notification devices: light emitting diode LED, speaker SPKR, or the vibrator unit VIBE. A signal is also sent to the transmitter or transceiver TRNS, which relays the signal to the peripheral alarm units. FIG. 6 is a schematic diagram of the notification pathway of the peripheral alarm unit 100. In peripheral alarm units 100 without a motion detector M, the receiver RECV sends the alarm signal through the signal generator SIG GEN and to the plurality of notification devices, similar to the control unit 10. In peripheral alarm units 100 with a motion detector M, the motion detector M sends a signal to the signal generator SIG GEN. The signal is then routed to the notification devices LED, SPKR, VIBE and the transceiver TRNS. The transceiver then sends the signal back to the control unit 10.

It is understood that the invention is not confined to the particular construction and arrangement of parts herein illustrated and described, but embraces such modified forms thereof as come within the scope of the following claims.

I claim:

1. A disaster warning system comprising:
a control unit, at least one peripheral alarm unit operationally connected to the control unit, and at least one peripheral acoustic sensor unit operationally connected to the control unit, wherein:
the control unit comprises:
a smoke detector,
a carbon monoxide detector,
a radio receiver, wherein the radio receiver is tunable to receive transmissions from commercial transmitters, governmental transmitters, and military transmitters, wherein the radio receiver is dimensioned and configured to receive location-specific weather alerts;
a plurality of notification devices comprising a light, a speaker, and a vibrator,
a transmitter,
a signal generator operationally connected to the transmitter,
a module board, and
a LCD screen, wherein the LCD screen displays textual information about the status of the disaster warning system and information received by the radio receiver;
wherein the at least one peripheral alarm unit is dimensioned and configured to create an alarm notification in response to an alarm signal transmitted by the control unit, the at least one peripheral alarm unit comprising:
a receiver,
a plurality of notification devices comprising a speaker, a light emitting diode, and a vibrator;
wherein the at least one peripheral acoustic sensor unit is dimensioned and configured to detect an acoustic signature of an approaching tornado, and upon detection of an acoustic signature of an approaching tornado the at least one peripheral acoustic sensor unit generates a tornado warning signal and sends the tornado warning signal to the control unit, the control unit decodes the tornado warning signal and activates the plurality of notification devices, and the control unit sends the tornado warning signal to the at least one peripheral alarm unit and the at least one peripheral alarm unit decodes the tornado warning signal and activates the plurality of notification devices;
wherein the control unit generates a warning signal when the smoke detector or carbon monoxide detector is activated and sends the warning signal to the at least one peripheral alarm unit, and the at least one peripheral alarm unit decodes the warning signal and activates the plurality of notification devices, and
wherein the radio receiver is dimensioned and configured to receive location-specific weather alerts and play the weather alerts through the speaker in the control unit, and wherein the control unit sends the weather alert to the at least one peripheral alarm unit, and the at least one peripheral alarm unit plays the weather alert through the speaker.

2. The disaster warning system of claim 1, wherein the at least one peripheral alarm unit is operationally linked to the control unit via a wireless connection.

3. The disaster warning system of claim 1, wherein the at least one peripheral alarm unit is operationally linked to the control unit via a hardwire connection.

4. The disaster warning system of claim 1, wherein the at least one peripheral acoustic sensor unit is operationally linked to the control unit via a wireless connection.

5. The disaster warning system of claim 1, wherein the at least one peripheral acoustic sensor unit is operationally linked to the control unit via a hardwire connection.

6. The disaster warning system of claim 1, wherein the module board is dimensioned and configured to allow the integration of additional disaster warning detectors into the home disaster warning system.

7. The disaster warning system of claim 1, wherein the control unit further comprises auxiliary input connections dimensioned and configured to connect to hardwired information services.

8. A disaster warning system comprising:
a control unit, at least one peripheral alarm unit operationally connected to the control unit, and at least one peripheral acoustic sensor unit operationally connected to the control unit, wherein:
the control unit comprises:
a radio receiver, wherein the radio receiver is tunable to receive transmissions from commercial transmitters, governmental transmitters, and military transmitters, wherein the radio receiver is dimensioned and configured to receive location-specific weather alerts;
a plurality of notification devices comprising a light, a speaker, and a vibrator,
a transmitter,
a signal generator operationally connected to the transmitter,
a module board, wherein the module board is dimensioned and configured to allow the integration of additional disaster warning detectors into the disaster warning system,
a smoke detector,
a carbon monoxide detector,
at least one modular notification device, wherein the at least one modular notification device collects data and generates a notification signal, and the at least one modular notification device is operationally connected to the module board,
a LCD screen, wherein the LCD screen displays textual information about the status of the disaster warning system, information received by the radio receiver, and the data collected by the at least one modular notification device;
a plurality of interfaces comprising telephone jacks, Ethernet jacks, and coaxial cable inputs, wherein the plurality of interfaces connect the control unit to wire-based information services and the Internet;
wherein the at least one peripheral alarm unit is dimensioned and configured to create an alarm notification in response to an alarm signal transmitted by the control unit, the peripheral alarm unit comprising:
a receiver,
a plurality of notification devices comprising a speaker, a light emitting diode, and a vibrator;
wherein the at least one peripheral acoustic sensor unit is dimensioned and configured to detect an acoustic signature of an approaching tornado, and upon detection of an acoustic signature of an approaching tornado the at least one peripheral acoustic sensor unit generates a tornado warning signal and sends the tornado warning signal to the control unit, the control unit decodes the tornado warning signal and activates the plurality of notification devices, and the control unit sends the tornado warning signal to the at least one peripheral alarm unit and the at least one peripheral alarm unit decodes the tornado warning signal and activates the plurality of notification devices;

wherein the control unit generates a warning signal when the smoke detector or carbon monoxide detector is activated and sends the warning signal to the at least one peripheral alarm unit, and the at least one peripheral alarm unit decodes the warning signal and activates the plurality of notification devices, and wherein the radio receiver is dimensioned and configured to receive location-specific weather alerts and play the weather alerts through the speaker in the control unit, and wherein the control unit sends the weather alert to the at least one peripheral alarm unit, and the at least one peripheral alarm unit plays the weather alert through the speaker.

9. The disaster warning system of claim 8, wherein the at least one peripheral alarm unit is operationally linked to the control unit via a wireless connection.

10. The disaster warning system of claim 8, wherein the at least one peripheral alarm unit is operationally linked to the control unit via a hardwire connection.

11. The disaster warning system of claim 8, wherein the at least one peripheral acoustic sensor unit is operationally linked to the control unit via a wireless connection.

12. The disaster warning system of claim 8, wherein the at least one peripheral acoustic sensor unit is operationally linked to the control unit via a hardwire connection.

13. The disaster warning system of claim 8, wherein the at least one modular notification device comprises a weather monitoring station.

14. The disaster warning system of claim 8, wherein the at least one modular notification device comprises a seismic disturbance monitor.

15. A disaster warning system comprising:
a control unit, at least one peripheral alarm unit operationally connected to the control unit, and at least one peripheral acoustic sensor unit operationally connected to the control unit, wherein:
the control unit comprises:
a radio receiver, wherein the radio receiver is tunable to receive transmissions from commercial transmitters, governmental transmitters, and military transmitters, wherein the radio receiver is dimensioned and configured to receive location-specific weather alerts;
a plurality of notification devices comprising a light, a speaker, and a vibrator,
a transceiver,
a signal generator operationally connected to the transceiver,
a module board, wherein the module board is dimensioned and configured to allow the integration of additional disaster warning detectors into the disaster warning system,
a smoke detector,
a carbon monoxide detector,
at least one modular notification device, wherein the at least one modular notification device collects data and generates a notification signal, and the at least one modular notification device is operationally connected to the module board,
a LCD screen, wherein the LCD screen displays textual information about the status of the disaster warning system, information received by the radio receiver, and the data collected by the at least one modular notification device;
a plurality of interfaces comprising telephone jacks, Ethernet jacks, and coaxial cable inputs, wherein the plurality of interfaces connect the control unit to wire-based information services and the Internet;

wherein the at least one peripheral alarm unit is dimensioned and configured to create an alarm notification in response to an alarm signal transmitted by the control unit, the at least one peripheral alarm unit comprising:
a transceiver,
a plurality of notification devices comprising a speaker, a light emitting diode, and a vibrator,
a motion detector, wherein the motion detector is dimensioned and configured to create a motion detection signal in response to motion, and send the motion detection signal to the control unit;

wherein the at least one peripheral acoustic sensor unit is dimensioned and configured to detect an acoustic signature of an approaching tornado, and upon detection of an acoustic signature of an approaching tornado the at least one peripheral acoustic sensor unit generates a tornado warning signal and sends the tornado warning signal to the control unit, the control unit decodes the tornado warning signal and activates the plurality of notification devices, and the control unit sends the tornado warning signal to the at least one peripheral alarm unit and the at least one peripheral alarm unit decodes the tornado warning signal and activates the plurality of notification devices;

wherein the control unit generates a warning signal when the smoke detector or a carbon monoxide detector is activated and sends the warning signal to the at least one peripheral alarm unit, and the at least one peripheral alarm unit decodes the warning signal and activates the plurality of notification devices; and wherein the radio receiver is dimensioned and configured to receive location-specific weather alerts and play the weather alerts through the speaker in the control unit, and wherein the control unit sends the weather alert to the at least one peripheral alarm unit, and the at least one peripheral alarm unit plays the weather alert through the speaker.

16. The disaster warning system of claim 15, wherein the at least one peripheral alarm unit is operationally linked to the control unit via a wireless connection.

17. The disaster warning system of claim 15, wherein the at least one peripheral alarm unit is operationally linked to the control unit via a hardwire connection.

18. The disaster warning system of claim 15, wherein the at least one peripheral acoustic sensor unit is operationally linked to the control unit via a wireless connection.

19. The disaster warning system of claim 15, wherein the at least one peripheral acoustic sensor unit is operationally linked to the control unit via a hardwire connection.

20. The disaster warning system of claim 15, wherein the at least one modular notification device comprises a weather monitoring station.

* * * * *